US011673107B2

(12) United States Patent
Shkolnikov et al.

(10) Patent No.: US 11,673,107 B2
(45) Date of Patent: Jun. 13, 2023

(54) SEQUENTIAL ENCAPSULATION OF REAGENTS

(71) Applicant: HEWLETT-PACKARD DEVELOPMENT COMPANY, L.P., Spring, TX (US)

(72) Inventors: Viktor Shkolnikov, Palo Alto, CA (US); Chien-Hua Chen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 89 days.

(21) Appl. No.: 16/606,368

(22) PCT Filed: May 1, 2018

(86) PCT No.: PCT/US2018/030476
§ 371 (c)(1),
(2) Date: Oct. 18, 2019

(87) PCT Pub. No.: WO2019/212536
PCT Pub. Date: Nov. 7, 2019

(65) Prior Publication Data
US 2021/0362116 A1 Nov. 25, 2021

(51) Int. Cl.
*B01L 3/00* (2006.01)
*B01J 13/02* (2006.01)

(52) U.S. Cl.
CPC .......... *B01J 13/02* (2013.01); *B01L 3/50273* (2013.01); *B01L 3/502784* (2013.01);
(Continued)

(58) Field of Classification Search
CPC .............. B01J 13/02; B01L 2300/0867; B01L 2400/0487; B01L 3/50273; B01L 3/502784
See application file for complete search history.

(56) References Cited

U.S. PATENT DOCUMENTS

| 4,675,236 A | 6/1987 | Ohkawara et al. |
| 6,368,562 B1 | 4/2002 | Yao |

(Continued)

FOREIGN PATENT DOCUMENTS

| CN | 102989383 A | 3/2013 |
| EP | 3127943 A4 | 9/2017 |

OTHER PUBLICATIONS

Adams et al., "Single step emulsification for the generation of multi-component double emulsions", Soft Matter, vol. 8, pp. 10719-10724. (Year: 2012).*

(Continued)

*Primary Examiner* — Young J Kim
(74) *Attorney, Agent, or Firm* — Foley & Lardner LLP (57) ABSTRACT

An example system includes a primary channel having a first end and a second end, at least two reagent reservoirs coupled to the first end, and a controller. Each reservoir contains a reagent in a fluid solution and is associated with an integrated pump to drive a reagent droplet from the corresponding reagent reservoir into the primary channel towards the second end. The controller is coupled to the integrated pumps and operates according to a sequence to actuate the integrated pumps, the sequence being indicative of reagents in the reagent reservoirs. The actuation of the pumps is to drive the reagent droplets from the reagent reservoirs into the primary channel in accordance with the sequence. The example system also includes a shell material reservoir with a shell material and an associated shell material pump to drive the shell material into the primary channel to encapsulate the reagent droplets.

11 Claims, 5 Drawing Sheets

(52) U.S. Cl.
CPC .......... *B01L 2200/0621* (2013.01); *B01L 2300/0867* (2013.01); *B01L 2400/0487* (2013.01)

(56) References Cited

U.S. PATENT DOCUMENTS

| | | | |
|---|---|---|---|
| 6,989,210 | B2 | 1/2006 | Gore |
| 8,357,318 | B2 | 1/2013 | Guisinger et al. |
| 8,822,387 | B2 | 9/2014 | Bragg et al. |
| 2002/0058273 | A1* | 5/2002 | Shipwash .......... G01N 33/6818 435/6.12 |
| 2005/0272159 | A1* | 12/2005 | Ismagilov ........... B01F 33/3021 436/34 |
| 2009/0286300 | A1 | 11/2009 | Vot et al. |
| 2010/0187705 | A1 | 7/2010 | Lee et al. |
| 2010/0285975 | A1 | 11/2010 | Mathies et al. |
| 2011/0229545 | A1 | 9/2011 | Shum et al. |
| 2015/0224466 | A1 | 8/2015 | Hindson et al. |
| 2018/0055084 | A1 | 3/2018 | Villar et al. |

OTHER PUBLICATIONS

Zhang et al., "Massively Parallel Single-Molecule and Single-Cell Emulsion Reverse Transcription Polymerase Chain Reaction Using Agarose Droplet Microfluidics," Analytical Chemistry, vol. 84, pp. 3599-3606. (Year: 2012).*

Hayes et al., "Microfluidic switchboards with integrated inertial pumps," Microfluidics and Nanofluidics, January, vol. 22, No. 15, pp. 1-9 (Year: 2018).*

* cited by examiner

SEQUENTIAL ENCAPSULATION OF REAGENTS

BACKGROUND

Microfluidic devices are increasingly commonplace in a variety of environments. For example, microfluidic devices have applicability in biology, medicine, genetics and numerous other fields. Microfluidic devices may include such devices as lab-on-a-chip micro-total analytical systems and can carry, analyze, or process various particles, bacteria, biological cells and other solid and soft objects of microscale. Various microfluidic devices may include fluids flowing through narrow channels. In a lab-on-a-chip, for example, blood cells may be moved from one chamber to another, such as from an input port to a reaction chamber. In other examples, the microfluidic device may be provided for the flow of other fluids or materials, such as blood or other biological fluids.

BRIEF DESCRIPTION OF THE DRAWINGS

For a more complete understanding of various examples, reference is now made to the following description taken in connection with the accompanying drawings in which.

DETAILED DESCRIPTION

As noted above, microfluidic devices may include fluids flowing through narrow channels. In various examples, the fluids may include reagents or other material to be released when desired. In various examples, the reagents are provided in capsules that may be released when desired. In some examples, a large number of targets, such as nucleic acid segments or proteins, may be tested or analyzed. Formation of the capsules with a variety of reagents to facilitate testing or analyzing of a large number of targets is desirable.

Various examples described herein allow for formation of reagent capsules for a large number of targets. Further, various examples described herein allow configuration or reconfiguration of various systems for specific purpose (e.g., application, testing or analysis). In this regard, example systems provide various reagent reservoirs with pumps to direct the reagents into a primary channel. The reagent may be provided in a droplet of aqueous solution, which may be directed into a flow of shell material which is to form the shell of capsules containing the reagents. A sequence may be provided to a controller to dictate the sequence of actuation of the pumps, thus providing a sequence of reagent capsules as desired. The sequence may be easily updated or modified to allow configuration or reconfiguration of the system.

Figure 1:
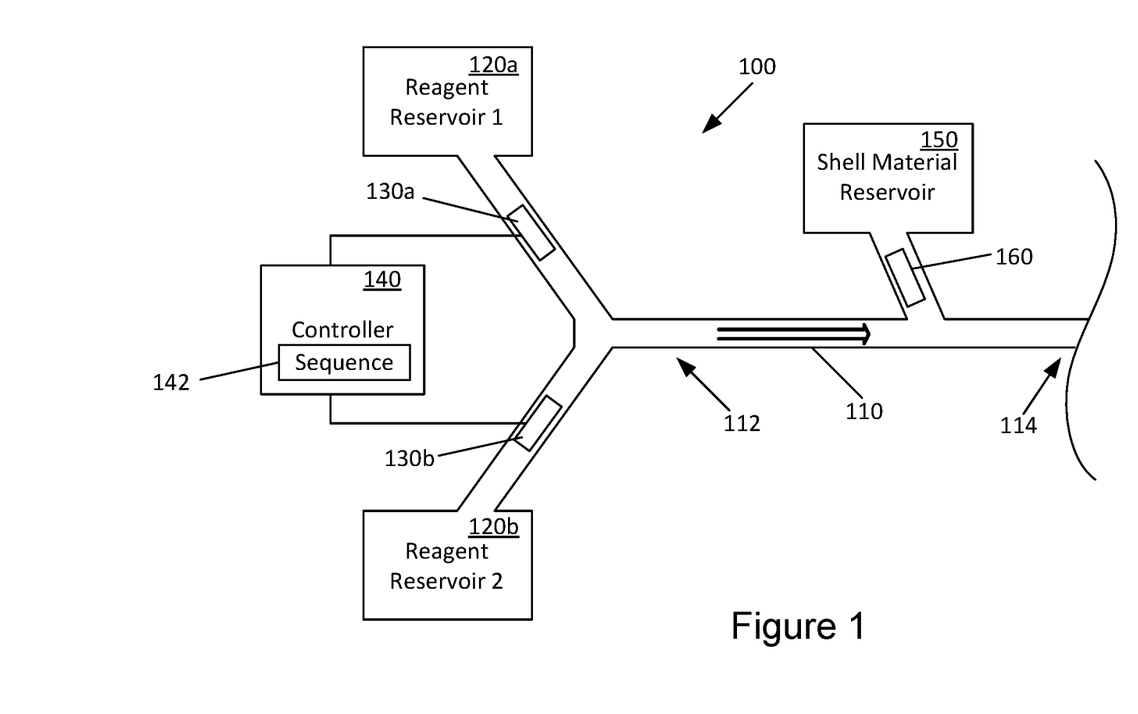
FIG. 1 illustrates an example system for sequential encapsulation of reagents.

Referring now to the Figures, FIG. 1 illustrates an example system 100 for sequential encapsulation of reagents. In various examples, the example system 100 may be implemented as a lab-on-a-chip or a part thereof. The example system 100 of FIG. 1 includes a primary channel 110 which may accommodate particles or fluid therein. In one example, the primary channel 110 is a microfluidic channel with a cross-sectional width of between about 10 μm and about 500 μm. The primary channel 110 of the example system 100 includes a first end 112 and a second end 114.

The example system further includes at least two reagent reservoirs 120a,b. Each reagent reservoir 120a,b is coupled to the first end 112 of the primary channel 110 and contains a reagent in a fluid solution. In various examples, the reagent may be any of a variety of particles including, but not limited to, nucleic acid segments, antibodies, antigens, or the like. Further, in one example, the fluid solution is an aqueous solution.

Each reservoir 120a,b is associated with an integrated pump 130a,b, such as an inertial pump, to drive a reagent droplet from the corresponding reagent reservoir 120a,b into the primary channel 110 towards the second end 112, as indicated by the arrow in the primary channel 110 shown in FIG. 1. In various examples, the integrated pumps are thermal inkjet resistors. In other examples, inertial pumps may be actuated by a piezo-drive membrane or by any other displacement device driven force such as, for example, electrostatic, pneumatic, magneto-strictive, magnetic or similar forces.

As used herein, an inertial pump corresponds to a fluid actuator and related components disposed in an asymmetric position in a microfluidic channel, where an asymmetric position of the fluid actuator corresponds to the fluid actuator being positioned less distance from a first end of a microfluidic channel as compared to a distance to a second end of the microfluidic channel. Accordingly, in some examples, a fluid actuator of an inertial pump is not positioned at a mid-point of a microfluidic channel. The asymmetric positioning of the fluid actuator in the microfluidic channel facilitates an asymmetric response in fluid proximate the fluid actuator that results in fluid displacement when the fluid actuator is actuated. Repeated actuation of the fluid actuator causes a pulse-like flow of fluid through the microfluidic channel.

In some examples, an inertial pump includes a thermal actuator having a heating element (e.g., a thermal resistor) that may be heated to cause a bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate unidirectional flow of the fluid. As will be appreciated, asymmetries of the expansion-collapse cycle for a bubble may generate such flow for fluid pumping, where such pumping may be referred to as "inertial pumping." In other examples, a fluid actuator corresponding to an inertial pump may comprise a membrane (such as a piezoelectric membrane) that may generate compressive and tensile fluid displacements to thereby cause fluid flow.

In this regard, a reagent droplet includes a volume of the fluid solution with the reagent in the fluid solution. The magnitude of the volume of the fluid solution in the droplet may be selected base on, for example, the size of the primary channel 110 or other components or the amount of reagent desire in the end product (e.g., capsule, as described below).

The example system 100 of FIG. 1 includes a controller 140 coupled to each of the at least two integrated pumps 130a,b. In various examples, the controller 140 operates according to a sequence 142 to actuate the integrated pumps 130a.b. In various examples, the sequence 142 may be embedded in the controller 140 or may be provided to the controller 140 by a user or an external processor (not shown in FIG. 1). For example, a user may input a desired sequence and a number of cycles through which the sequence is to be processed.

The sequence 142 of the example system 100 is indicative of reagents in the reagent reservoirs 120a.b. Actuation of the pumps 130a,b by the controller 140 drives reagent droplets from the reagent reservoirs 120a,b into the primary channel 110 in accordance with the sequence 142. For example, the sequence 142 may indicate 11121112 . . . , indicating that the controller actuate the integrated pump 130a corresponding to the reagent reservoir 120a containing the first reagent three times, followed by a single actuation of the integrated pump 130b corresponding to the reagent reservoir 120b containing the second reagent. Of course, any practical sequence may be used.

The example system 100 further includes a shell material reservoir 150. The shell material reservoir is provided with a shell material that is in fluid form in the shell material reservoir 150. The shell material may be selected from any of a variety of materials. In various examples, the shell material is a thermally degradable material. In this regard, a shell formed by the shell material may degrade with the addition to thermal energy. In one example, the shell material is a wax or a polymer. The shell material may be selected based on a variety of factors, such as the melting point of the shell material. In various examples, the shell material may be icosane ($C_{20}H_{42}$), triacontane ($C_{30}H_{62}$), tetracontane ($C_{40}H_{82}$), pentacontane ($C_{50}H_{102}$), hexacontane ($C_{60}H_{122}$), or a combination thereof. The shell material reservoir 150 is associated with a shell material pump 160 to drive the shell material from the shell material reservoir 150 into the primary channel 110 to encapsulate the reagent droplets, as described in greater detail below with reference to FIG. 4.

Figure 2:
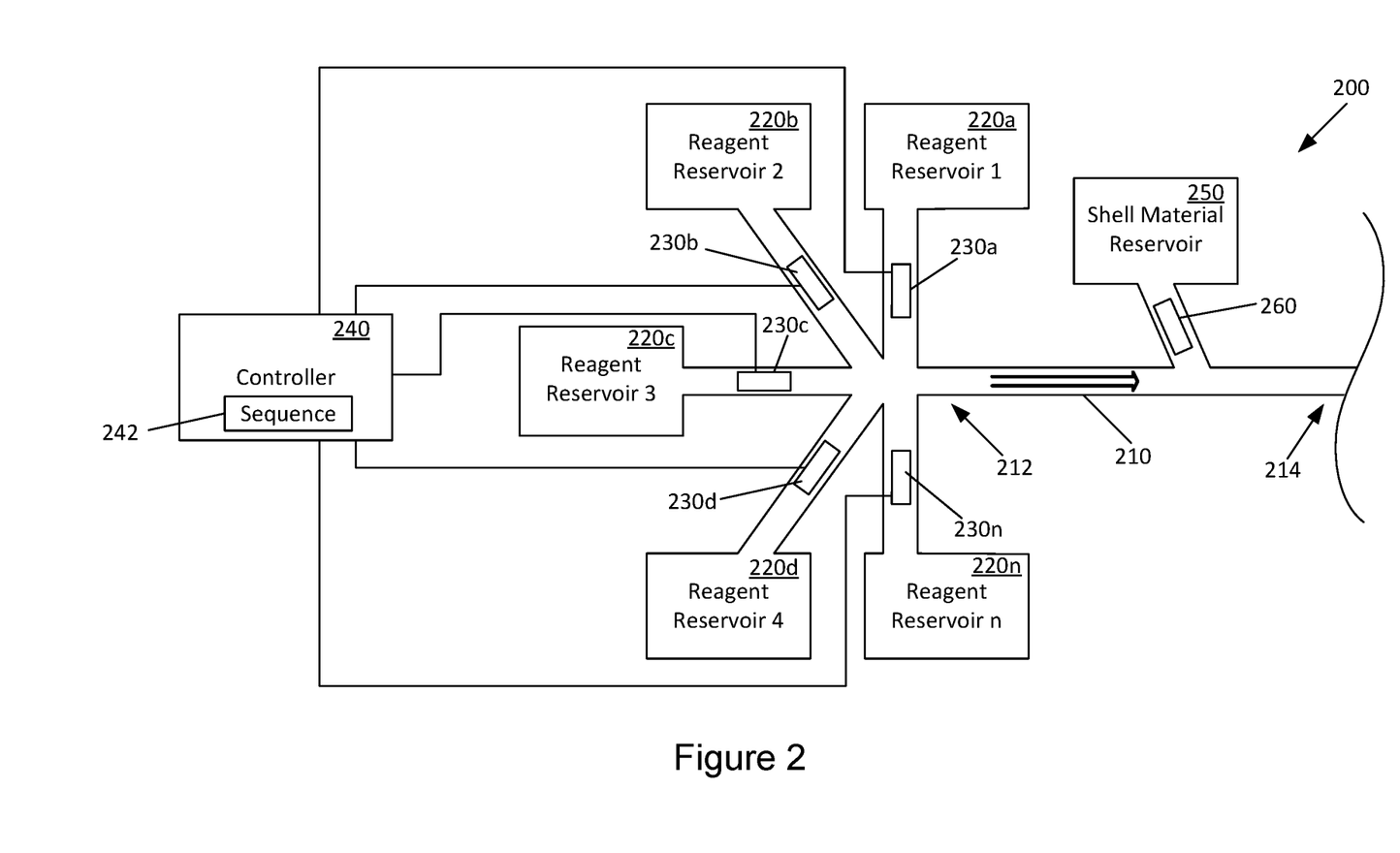
FIG. 2 illustrates another example system for sequential encapsulation of reagents.

Referring now to FIG. 2, another example system for sequential encapsulation of reagents is illustrated. Similar to the example system 100 described above with reference to FIG. 1, the example system 200 of FIG. 2 may be implemented as a lab-on-a-chip or a part thereof. The example system 200 of FIG. 2 includes a primary channel 210 which may accommodate particles or fluid therein.

The example system further includes an array of reagent reservoirs 220a-n. Each reagent reservoir 220a-n is coupled to the first end 212 of the primary channel 210 and is in fluid communication with the primary channel 210. Each reagent reservoir 220a-n contains a reagent in a fluid solution. In various examples, each reagent reservoir 220a-n contains a different reagent. In some examples, some reservoirs 220a-n may contain the same reagent as other reservoirs, as may be the case for a reagent that is used more often than others.

The example system 200 includes an array of integrated pumps 230a-n. Each integrated pump 230a-n is associated with at least one reagent reservoir in the array of reservoirs 220a-n. For example, the first integrated pump 230a is associated with the first reagent reservoir 220a. Various examples may include any practical number of reservoirs 220a-n and the number of pumps 230a-n. Further, the array of reservoirs 220a-n and the array of pumps 230a-n may be positioned in a variety of manners. For example, FIG. 2 illustrates the array of reservoirs 220a-n arranged in a circular pattern. In other examples, the reservoirs 220a-n may be positioned in a linear arrangement or any other practical two-dimensional or three-dimensional arrangement.

As illustrated in FIG. 2, each integrated pump 230a-n is positioned to drive droplets of the reagent in the associated reservoir 220a-n into the primary channel 210 towards the second end 214 of the primary channel 210, as indicated by the arrow in the primary channel 210 shown in FIG. 2. In this regard, a reagent droplet may include a volume of the fluid solution with the reagent in the fluid solution.

The example system 200 of FIG. 2 includes a controller 240 coupled to each integrated pump 230a-n. In various examples, the controller 240 is provided to sequentially pulse the integrated pumps 230a-n according to a sequence 242. As noted above, the sequence 242 may be embedded in the controller 240 or may be provided to the controller 240 by a user or an external processor.

In various examples, the pulsing of the integrated pumps 230a-results in a flow of reagent droplets from the reagent reservoirs 220a-n in accordance with the sequence 242. The flow of reagent droplets is directed through the primary channel 210.

The example system 200 further includes a shell material reservoir 250. The shell material reservoir 250 is provided with a shell material that is in fluid form in the shell material reservoir 250 to allow the shell material to flow into the primary channel 210. As noted above, in one example, the shell material is a wax or a polymer. The shell material in the shell material reservoir 250 is to be directed into the primary channel 210 to form a shell material flow encapsulating each reagent droplet in the flow of reagent droplets described above. In this regard, the example system 200 is provided with a pump 260 to facilitate flow of the shell material from the shell material reservoir 250 into the primary channel 210.

Figure 3:
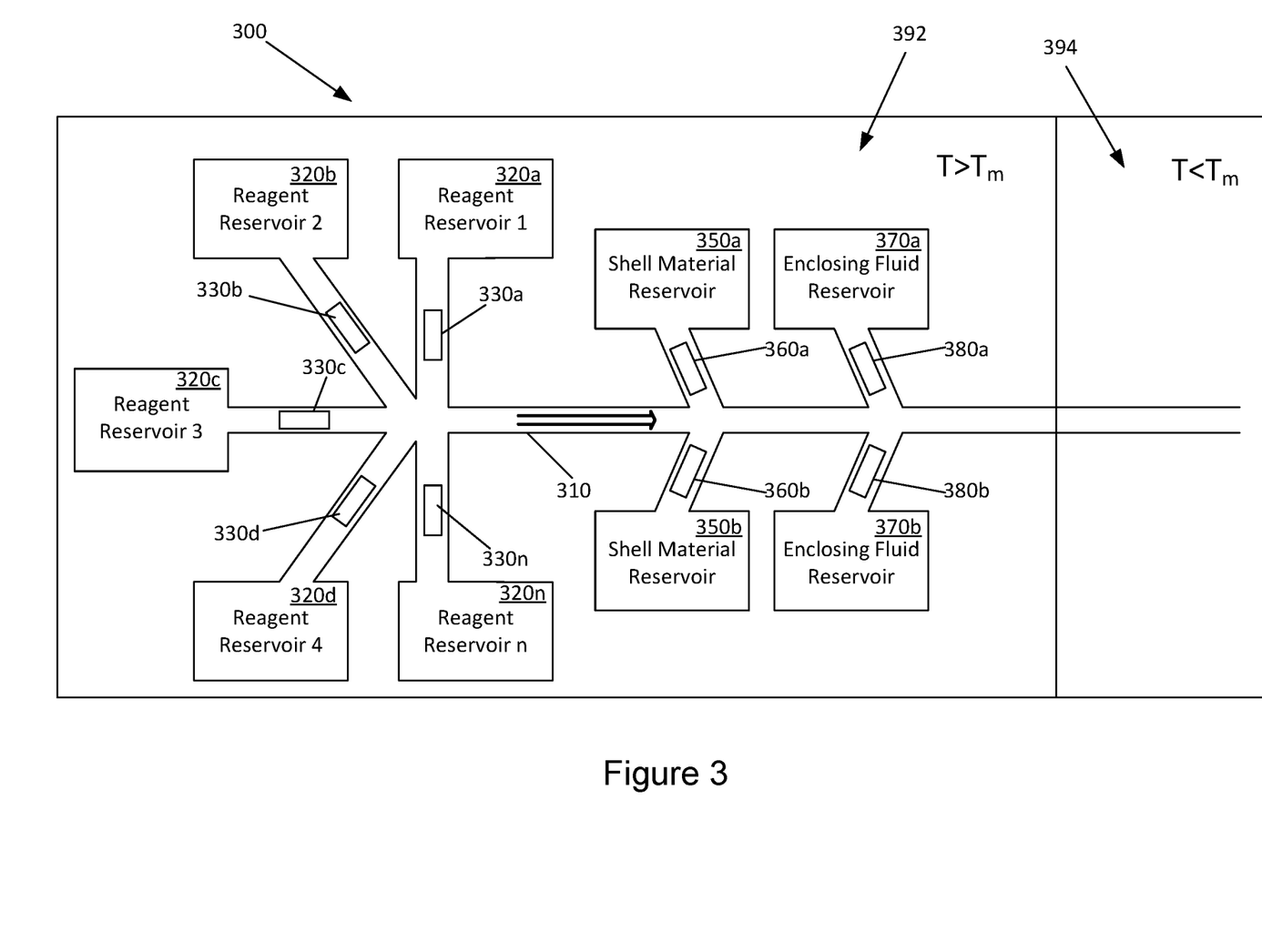
FIG. 3 illustrates another example system for sequential encapsulation of reagents.

Referring now to FIG. 3, another example system for sequential encapsulation of reagents is illustrated. The example system 300 of FIG. 3 is similar to the example system 200 and includes a primary channel 310, an array of reagent reservoirs 320a-n coupled to the primary channel 310, and an array of integrated pumps 330a-n associated with the reagent reservoirs 320a-n. As noted above, each reagent reservoir 320a-n contains a reagent in a fluid solution. In the example illustrated in FIG. 3, the example system 300 is provided with two shell material reservoirs 350a,b. The number and size of the shell material reservoirs 350a,b may be varied based on the various parameters, such as the size of the shell desired for capsules to be formed by the example system 300, for example. Thicker shells may warrant larger amounts of shell material and, therefore, larger size or larger number of shell material reservoirs 350a,b.

The example system 300 of FIG. 3 further includes enclosing fluid reservoirs 370a,b containing an enclosing fluid. As described below with reference to FIG. 4, the enclosing fluid facilitates pinching of the flow of the shell material to form capsules. In this regard, enclosing fluid pumps 380a,b are provided to facilitate flow of the enclosing fluid into the primary channel 310.

The example system 300 of FIG. 3 includes a high temperature zone 392 and a low temperature zone 394. In various examples, the high temperature zone 392 has a temperature greater than a melting point of the shell material. In this regard, the high temperature allows the shell material to flow from the shell material reservoir 350a into the primary channel 310. On the other hand, the low temperature zone has a temperature lower than the melting point of the shell material. As further described below with reference to FIG. 4, the lower temperature in the low temperature zone 394 allows the shell of the capsule formed to become stable or hardened. In this regard, the low temperature zone 394 may also be referred to as the cooling zone since it allows for cooling of the shell material.

Figure 4:
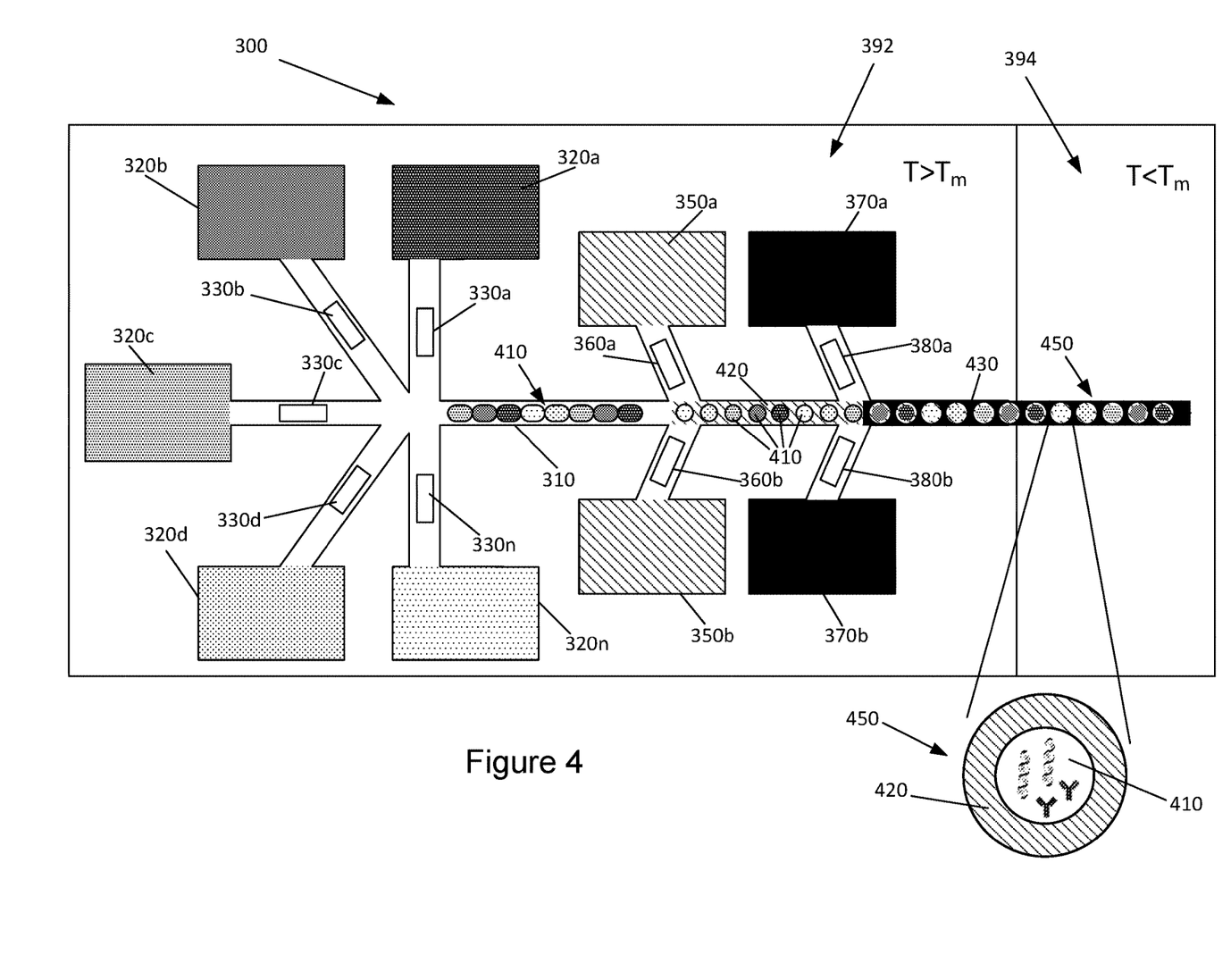
FIG. 4 illustrates sequential encapsulation of reagents using the example system of FIG. 3.

Referring now to FIG. 4, sequential encapsulation of reagents using the example system of FIG. 3 is illustrated. FIG. 4 illustrates each reagent reservoir 320a-n with different shading to represent a different reagent. As noted above, the pumps 330a-n are actuated in accordance with a sequence that may be provided in or to a controller coupled to the pumps 330a-n. Actuating, or pulsing, the pumps 330a-n generates a flow of reagent droplets 410 in the primary channel 310. In one example, the pumps 330a-n are actuated to generate a continuous flow of reagent droplets.

The flow of reagent droplets is directed into a flow of shell material 420 from the shell material reservoirs 350a,b. The flow of shell material 420 into the primary channel 310 causes encapsulation of the reagent droplets 410 by the shell material 420. The rate of flow of the shell material 420 into the primary channel 310 may be selected based on a desired thickness of the shell encapsulating the reagent droplets. A greater flow rate may provide a larger amount of shell material per reagent droplet, thus producing a thicker shell.

The combination of the reagent droplets 410 with the shell material 420 results in a two phase flow. In this regard, the shell material 420, which may be a wax material, encapsulates a reagent droplet 410, which may be a reagent in an aqueous solution. The two-phase flow is directed into a flow of an enclosing fluid 430. As noted above, the enclosing fluid 430 may be directed from the enclosing fluid reservoirs 370a,b into the primary channel 310 by the pumps 380a,b. In various examples, the flow of the enclosing fluid 430 into the primary channel causes pinching of the shell material 420 to form capsules 450. Each capsule 450 includes the shell material 420 encapsulating a reagent droplet (e.g., reagent in an aqueous solution).

In the example of FIGS. 3 and 4, the primary channel 410 is in the high temperature zone 392 at least until the addition of the flow of the enclosing material 430. Thus, the shell material 420 may remain in a softened, partially degraded or partially melted when the enclosing material 430 is injected into the primary channel 310. This allows the shell material to be pinched by the enclosing material.

The flow is then directed into the low-temperature zone 394. The lower temperature allows cooling of the enclosing material 430, which in turn allows cooling of the shell material 420. Thus, the shell of the capsule 450 may be hardened to more completely form the capsules. The capsules 450 may then be directed to another component, such as a reaction chamber or storage reservoir, for example.

Figure 5:
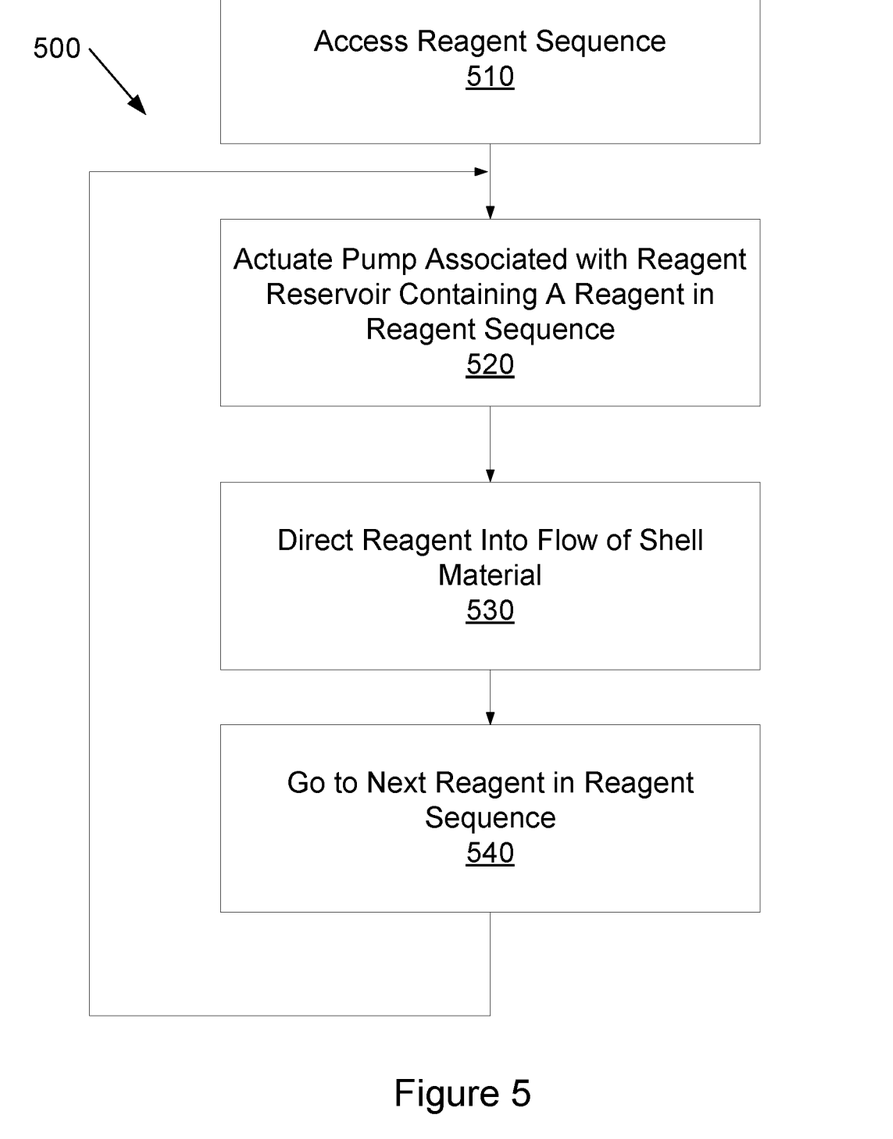
FIG. 5 is a flow chart illustrating an example method for sequential encapsulation of reagents.

Referring now to FIG. 5, a flow chart illustrating an example method for sequential encapsulation of reagents is provided. The example method 500 of FIG. 5 may be implemented in a system such as those illustrated in FIGS. 1-4 above. In various examples, the example method 500 may be implemented at least partly in a controller, such as the controllers 140, 240 of FIGS. 1 and 2, respectively.

The example method 500 includes accessing a reagent sequence (block 510). As noted above, the reagent sequence may be provided in the controller or to the controller by a user or another device. The reagent sequence includes a sequence indicative of reagents in an array of reagent reservoirs, such as the reagent reservoirs 320a-n in FIGS. 3 and 4. An integrated pump associated with each reagent reservoir 320a-n directs reagent droplets from the reagent reservoirs to a primary channel.

The example method 500 further includes actuating a pump associated with a reagent reservoir containing a reagent in the sequence (block 520). Actuating of the pump directs a droplet of the reagent into the primary channel.

The reagent droplet is then directed into a flow of shell material to encapsulate the droplet (block 530). For example, as described above with reference to FIG. 4, the flow of reagent droplets 410 is directed in the primary channel 310 into the flow of shell material 420. The process is then repeated for the next reagent in the sequence (block 540).

Thus, various examples described above can allow configuration or reconfiguration of various systems. For example, the sequence for reagents may be easily updated or modified for the specific application, analysis or testing to be performed. Further, various example systems described above allow for analysis or testing or a large number of targets.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
   a primary channel having a first end and a second end;
   at least two reagent reservoirs coupled to the first end of the primary channel, each reagent reservoir containing a reagent in a fluid solution, each reagent reservoir being associated with an integrated pump located fluidically downstream from the reagent reservoir to drive a reagent droplet from the corresponding reagent reservoir into the primary channel towards the second end;
   a controller coupled to each of the at least two integrated pumps, the controller operating according to a sequence to actuate the integrated pumps, the sequence being indicative of reagents in the reagent reservoirs, the actuation of the pumps being to drive the reagent droplets from the reagent reservoirs into the primary channel in accordance with the sequence; and
   a shell material reservoir including a shell material and being associated with a shell material pump to drive the shell material into the primary channel to encapsulate the reagent droplets, wherein said shell material is a wax or a polymer;
   wherein the shell material reservoir is coupled to the primary channel fluidically downstream from the couple of the least two reagent reservoirs.

2. The system of claim 1, wherein each reagent reservoir contains a different reagent.

3. The system of claim 1, further comprising:
an enclosing fluid reservoir containing an enclosing fluid; and
an enclosing fluid pump to drive the enclosing fluid into the primary channel to pinch the shell material flow to form capsules of shell material encapsulating a reagent droplet.

4. The system of claim 3, further comprising:
a cooling zone, the primary channel extending into the cooling zone after formation of capsules, the cooling zone having a temperature below a melting point of the shell material.

5. The system of claim 1, wherein each of the at least two reagent reservoirs are coupled to the primary channel by a microfluidic channel and the integrated pump is disposed within the microfluidic channel.

6. The system of claim 1, wherein each integrated pump is an inertial pump.

7. A system, comprising:
a primary channel having a first end and a second end;
an array of reagent reservoirs coupled to the first end of the primary channel, each reservoir containing a reagent in a fluid solution associated with the reservoir, each reservoir in the array of reservoirs being in fluid communication with the primary channel;
an array of integrated pumps, each integrated pump in the array of integrated pumps being fluidically downstream from a reagent reservoir in the array of reagent reservoirs, each integrated pump being positioned to drive the reagent in the upstream reagent reservoir into the primary channel towards the second end;
a controller coupled to each integrated pump in the array of integrated pump, the controller being to sequentially pulse pumps in the array of integrated pumps according to a sequence, the pulsing of pumps generating a flow of reagent droplets from the reagent reservoirs in accordance with the sequence, the flow being directed through the primary channel; and
a shell material reservoir including a shell material being in fluid communication with the primary channel, the shell material being directed into the primary channel to form a shell material flow encapsulating each reagent droplet in the flow of reagent droplets, wherein said shell material is a wax or polymer;
wherein the shell material reservoir is coupled to the primary channel fluidically downstream from the couple of the array of reagent reservoirs.

8. The system of claim 7, wherein each reagent reservoir contains a different reagent.

9. The system of claim 7, further comprising:
an enclosing fluid reservoir containing an enclosing fluid being in fluid communication with the primary channel, the enclosing fluid to be directed into the primary channel to pinch the shell material flow to form capsules of shell material encapsulating a reagent droplet.

10. The system of claim 9, including a high temperature zone and a low temperature zone, the high temperature zone having a temperature greater than a melting point of the shell material, the low temperature zone having a temperature lower than the melting point of the shell material,
wherein the primary channel is directed from the high temperature zone to the low temperature zone downstream of the enclosing fluid reservoir.

11. The system of claim 7, wherein each of the array of reagent reservoirs is coupled to the primary channel by a microfluidic channel and the integrated pump is disposed within the microfluidic channel.

\* \* \* \* \*